(12) United States Patent
Datta et al.

(10) Patent No.: US 10,819,536 B1
(45) Date of Patent: *Oct. 27, 2020

(54) WAN-SPAN LAN (WSL) NETWORKING TECHNOLOGY

(71) Applicant: FatPipe, Inc., Salt Lake City, UT (US)

(72) Inventors: Sanchaita Datta, Salt Lake City, UT (US); Bhaskar Ragula, Salt Lake City, UT (US); Xiaoxiong Fan, Salt Lake City, UT (US); Sankhadip Sengupta, Salt Lake City, UT (US)

(73) Assignee: FatPipe, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/439,555

(22) Filed: Jun. 12, 2019

Related U.S. Application Data

(63) Continuation of application No. 15/648,734, filed on Jul. 13, 2017, now Pat. No. 10,374,830.

(60) Provisional application No. 62/428,458, filed on Nov. 30, 2016, provisional application No. 62/363,290, filed on Jul. 17, 2016.

(51) Int. Cl.
    *H04L 12/46* (2006.01)
(52) U.S. Cl.
    CPC ...... *H04L 12/4633* (2013.01); *H04L 12/4604* (2013.01); *H04L 12/4641* (2013.01); *H04L 2212/00* (2013.01)
(58) Field of Classification Search
    None
    See application file for complete search history.

(56) References Cited

U.S. PATENT DOCUMENTS

| | | | |
|---|---|---|---|
| 6,253,247 B1 | 6/2001 | Bhaskar et al. | |
| 6,295,276 B1 | 9/2001 | Datta et al. | |
| 6,493,341 B1 | 12/2002 | Datta et al. | |
| 6,775,235 B2 | 8/2004 | Datta et al. | |
| 7,269,143 B2 | 9/2007 | Datta et al. | |
| 7,406,048 B2 | 7/2008 | Datta et al. | |
| 7,444,506 B1 | 10/2008 | Datta et al. | |
| 7,877,510 B2 | 1/2011 | Datta et al. | |
| 8,356,346 B2 | 1/2013 | Datta et al. | |
| 8,780,811 B1 | 7/2014 | Datta et al. | |
| 8,995,252 B2 | 3/2015 | Datta et al. | |
| 10,347,830 B2 * | 7/2019 | Manipatruni | ....... H01L 45/1233 |
| 2005/0068897 A1 | 3/2005 | Arita et al. | |

(Continued)

OTHER PUBLICATIONS

"IPsec", retrieved from <<https://en.wikipedia.org/wiki/IPsec>>, Apr. 19, 2015, 10 pages (in parent U.S. Appl. No. 15/648,734, filed Jul. 13, 2017).

(Continued)

*Primary Examiner* — Bunjob Jaroenchonwanit
(74) *Attorney, Agent, or Firm* — Ogilvie Law Firm

(57) ABSTRACT

Tools and technologies geographically extend local area networks by transparently inserting transmission of encapsulated local area network frames over wide area network connections. Some devices receive frames from a switch or other physically addressed device using layer 2 protocols, encapsulate them, and send them over a wide area network to a similar remote device which decapsulates the frames and forwards them using layer 2 protocols. Load balancing, quality of service, compression, encryption, and other packet processing may be performed on the encapsulated packets.

20 Claims, 4 Drawing Sheets

(56) References Cited

U.S. PATENT DOCUMENTS

| | | |
|---|---|---|
| 2008/0028077 A1 | 1/2008 | Kamata et al. |
| 2014/0307541 A1 | 10/2014 | Badoni et al. |
| 2015/0127701 A1 | 5/2015 | Chu et al. |
| 2015/0169451 A1 | 6/2015 | Jackson |
| 2015/0312117 A1 | 10/2015 | Behera et al. |
| 2016/0191361 A1 | 6/2016 | Behera et al. |

OTHER PUBLICATIONS

"FatPipe MPVPN Version 7.1.2 User's Manual" excerpts, no later than Oct. 19, 2016, 13 pages (in parent U.S. Appl. No. 15/648,734, filed Jul. 13, 2017).

"IP header", retrieved from <<https://en.wikipedia.org/wiki/IP_header>22 , Mar. 28, 2017, 2 pages (in parent U.S. Appl. No. 15/648,734, filed Jul. 13, 2017).

"MAC address", retrieved from <<https://en.wikipedia.org/wiki/MAC_address>>, Jul. 3, 2017, 4 pages (in parent U.S. Appl. No. 15/648,734, filed Jul. 13, 2017).

"Encapsulation (networking)", retrieved from <<https://en.wikipedia.org/wiki/Encapsulation_(networking)>>, Jun. 11, 2017, 2 pages (in parent U.S. Appl. No. 15/648,734, filed Jul. 13, 2017).

"Network switch", retrieved from <<https://en.wikipedia.org/wiki/Network_switch>>, May 6, 2017, 7 pages (in parent U.S. Appl. No. 15/648,734, filed Jul. 13, 2017).

"Frame (networking)", retrieved from <<https://en.wikipedia.org/wiki/Frame_(networking)>>, Jun. 27, 2017, 2 pages (in parent U.S. Appl. No. 15/648,734, filed Jul. 13, 2017).

"Wide area network", retrieved from <<https://en.wikipedia.org/wiki/Wide_area_network>>, Jul. 5, 2017, 4 pages (in parent U.S. Appl. No. 15/648,734, filed Jul. 13, 2017).

"Local area network", retrieved from <<https://en.wikipedia.org/wiki/Local_area_network>>, May 27, 2017, 4 pages (in parent U.S. Appl. No. 15/648,734, filed Jul. 13, 2017).

Jim Duffy, "Avaya's simple plan", <<http://www.networkworld.com/article/2358824/cisco-subnet/avayas-simple-plan.html>>, Jun 3, 2014, 4 pages (in parent U.S. Appl. No. 15/648,734, filed Jul. 13, 2017).

Orhan Ergun, "Bridging, Provider Bridging, Provider Backbone, and Shortest Path Bridging", <<https://orhanergun.net/2015/05/bridgingprovider-bridgingprovider-backbone-and-shortest-path-bridging/>>, May 6, 2015, 16 pages (in parent U.S. Appl. No. 15/648,734, filed Jul. 13, 2017).

"Ethernet frame", <<https://en.wikipedia.org/wiki/Ethernet_frame>>, Aug. 13, 2016, 7 pages (in parent U.S. Appl. No. 15/648,734, filed Jul. 13, 2017).

"LAN Distance Limitations", <<http://cs.gettysburg.edu/~jfink/courses/cs322slides/3-9.pdf>>, Mar. 9, 2001, 20 pages (in parent U.S. Appl. No. 15/648,734, filed Jul. 13, 2017).

"IEEE 802.1aq", <<https://en.wikipedia.org/wiki/IEEE_802.1aq>>, Aug. 22, 2016, 20 pages (in parent U.S. Appl. No. 15/648,734, filed Jul. 13, 2017).

"IS-IS", <<https://en.wikipedia.org/wiki/IS-IS>>, Jul. 28, 2016, 4 pages (in parent U.S. Appl. No. 15/648,734, filed Jul. 13, 2017).

"Router Vs Layer 3 Switch . . . ", <<https://learningnetwork.cisco.com/thread/10642>>, May 5, 2015, 9 pages (in parent U.S. Appl. No. 15/648,734, filed Jul. 13, 2017).

"Link-state routing protocol", <<https://en.wikipedia.org/wiki/Link-state_routing_protocol>>, Oct. 14, 2016, 6 pages (in parent U.S. Appl. No. 15/648,734, filed Jul. 13, 2017).

"Layer 3 versus Layer 2 Switch for VLANs", <<https://documentation.meraki.com/MS/Layer_3_Switching/Layer_3_versus_Layer_2_Switch_for_VLANs>>, no later than Oct. 25, 2016, 3 pages (in parent U.S. Appl. No. 15/648,734, filed Jul. 13, 2017).

"Residential gateway", <<https://en.wikipedia.org/wiki/Residential_gateway>>, Jun. 9, 2016, 4 pages (in parent U.S. Appl. No. 15/648,734, filed Jul. 13, 2017).

"Router (computing)", <<https://en.wikipedia.org/wiki/Router_(computing)>>, Oct. 21, 2016, 8 pages (in parent U.S. Appl. No. 15/648,734, filed Jul. 13, 2017).

Ron Pacchiano, "The Difference Between a Router, Switch and Hub", <<http://www.webopedia.com/DidYouKnow/Hardware_Software/router_switch_hub.asp>>, Sep. 16, 2016, 4 pages (in parent U.S. Appl. No. 15/648,734, filed Jul. 13, 2017).

"TRILL (computing)", <<https://en.wikipedia.org/wiki/TRILL_(computing)>>, Aug. 14, 2016, 4 pages (in parent U.S. Appl. No. 15/648,734, filed Jul. 13, 2017).

"Virtual Extensible LAN", <<https://en.wikipedia.org/wiki/Virtual_Extensible_LAN>>, Jul. 5, 2016, 2 pages (in parent U.S. Appl. No. 15/648,734, filed Jul. 13, 2017).

"Virtual LAN", <<https://en.wikipedia.org/wiki/Virtual_LAN>>, Oct. 24, 2016, 8 pages (in parent U.S. Appl. No. 15/648,734, filed Jul. 13, 2017).

"WARP", <<https://web.archive.org/web/20161023033359/http://www.fatpipeinc.com/products/warp/index.php>>, Oct. 23, 2016, 3 pages (in parent U.S. Appl. No. 15/648,734, filed Jul. 13, 2017).

\* cited by examiner

WAN-SPAN LAN (WSL) NETWORKING TECHNOLOGY

RELATED APPLICATIONS

The present application hereby incorporates by reference the entirety of, and claims priority to, the following: U.S. patent application Ser. No. 15/648,734 filed Jul. 13, 2017, U.S. patent application No. 62/363,290 filed Jul. 17, 2016, and U.S. patent application No. 62/428,458 filed Nov. 30, 2016.

BACKGROUND

Computers, printers, and other networked devices are organized into different kinds of networks. Two of the most widely used kinds of networks are local area networks (LANs) and wide area networks (WANs). LANs and WANs each have relative advantages and disadvantages. LANs are generally faster, less expensive, and easier to configure than WANs, but WANs may contain many more devices and may span much greater physical distances than LANs.

LANs and WANs each use different technical conventions and different network protocols for addressing devices in a given network. LANs generally use media access control (MAC) addresses, which are also called "physical addresses" because they are typically assigned to and physically embedded within a network interface controller (NIC) of a device by the NIC manufacturer when the NIC is made. The Ethernet protocols used in many LANs, for example, use MAC addresses as network addresses. By contrast, WANs often use internet protocol (IP) addresses as network addresses. IP addresses are generally not physically embedded or otherwise unique to a device; a given device may be identified by different IP addresses at different times. The widely used Dynamic Host Configuration Protocol (DHCP) used in many WANs, for example, assigns IP addresses to devices dynamically, an act which would not be needed if IP addresses were physically embedded in the devices.

SUMMARY

Some embodiments described herein address shortcomings of networking technologies, such as the geographic scope limitations on local area networks and the intra-network speed limitations and complexity of wide area networks. Some embodiments correlate physical addresses and IP addresses by using both for a given forwarding operation. Some embodiments receive a frame addressed with a device's physical address and transmit the frame encapsulated in an IP packet to a corresponding remote device which receives the packet addressed with the IP address and forwards the decapsulated frame using a physical address as the destination address. These embodiments differ from simple bridges, which receive and transmit a given frame using only physical addresses, and differ from simple routers, which receive and transmit a given packet using only IP addresses.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Figure 1:
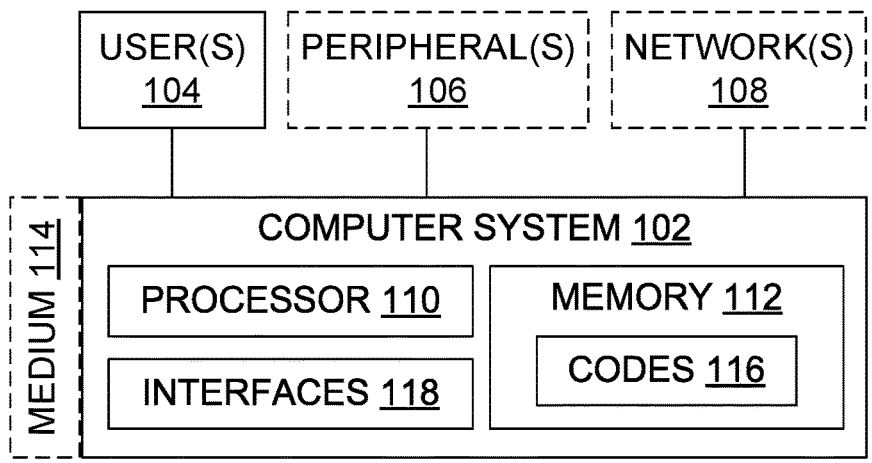
FIG. 1 is a block diagram illustrating a computer system.

Some acronyms and abbreviations are defined below. Others may be defined elsewhere herein or require no definition to be understood by one of skill.

CD: compact disc
DA: destination address
DVD: digital versatile disc
ESP: encapsulating security payload
FCS: frame check sequence
GRE: generic routing encapsulation
ICMP: internet control message protocol
IP: internet protocol
IPV4: internet protocol version 4
ISP: internet service provider
IS-IS: intermediate system to intermediate system
LAN: local area network
MAC: media access control
MPLS: multiprotocol label switching
MPSEC: mark of FatPipe Networks for general purpose communications connectivity software used to establish redundant connections between a computer and computer networks, and user manuals sold as a unit therewith
MPVPN: mark of FatPipe Networks for computer hardware and communications software for connecting computer networks via multiple paths, in the field of data transmission
NIC: network interface controller
RAM: random access memory
ROM: read-only memory
SD: software-defined
SDWAN or SD-WAN: software-defined wide area network
SPB: shortest path bridging
TAG: tag, e.g., in Ethernet frame
TCP: transmission control protocol
TRILL: transparent interconnection of lots of links
UDP: user datagram protocol
VoIP: voice over IP
VLAN: virtual local area network
VPN: virtual private network
VXLAN: virtual extensible LAN
WAN: wide area network
WSL: WAN-span LAN, WAN-spanning LAN, WAN-spanned LAN Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 130 may be a removable peripheral 106 or may be an integral part of the system 102. Interfaces 118 include one or more of: interfaces with human users, interfaces with peripherals, interfaces with other computer systems 102, network interfaces. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated. A GUI may be generated on a local desktop computer, or on a smart phone, for example, or it may be generated from a web server and sent to a client device 102.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions that are executable by a processor 110; "executable" is used in a broad sense herein to include machine code, interpretable code, bytecode, and/or other software or firmware code 116 that runs on hardware, on a kernel, or on a virtual machine, for example. The medium 114 is also configured with data which is created, modified, referenced, and/or otherwise used for technical effect by execution of the instructions 116. The instructions 116 and the data (which is be considered code 116 to the extent it controls operation of the system 102) configure the memory or other storage medium 114 in which they reside. When that memory or other computer readable storage medium is a functional part of a given computer system, the instructions and data also configure that computer system.

Although an embodiment may be described as being implemented as or partially as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 132 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (CPUs, ALUs, FPUs, and/or GPUs), memory/storage media 112, and displays, an operating environment may also include other hardware, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by one or more networks 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Example Networking Configuration

Figure 2:
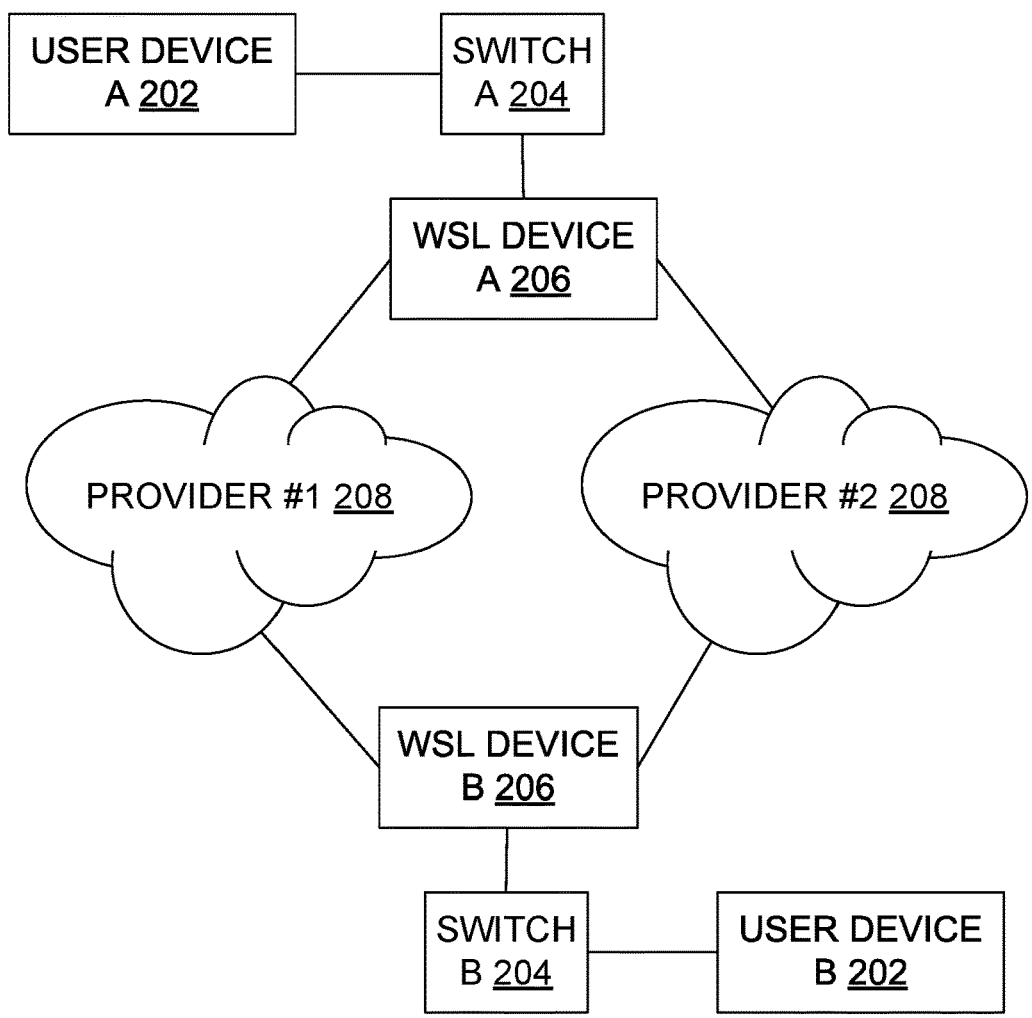
FIG. 2 is a network configuration diagram illustrating network extension devices, referred to as "WSL devices", and some related network components.

FIG. 2 shows an example networking configuration incorporating innovative technology described herein to support traffic between two sites A and B. At site A, a user device A 202 may be a personal computer, laptop, tablet, smartphone, networked embedded system device such as a smart appliance, vehicle, server, or other networked device. As a particular example, assume device A has an IP address in a LAN 192.168.30.100/24. Device A connects via Ethernet or other LAN technology to a switch A 204. As a particular example, switch A may be an Avaya 4850GTS switch, but LAN switches 204 (layer 2 switch devices 204) from a variety of manufacturers may be used as taught herein; in addition to Avaya, switches 204 are available from Cisco, Nokia, Huawei, and other manufacturers. Switch A connects via Ethernet or other LAN technology to a WSL device A 206. As a particular example WSL device A may have a LAN subnet for VPN 192.168.1.1/30, and a counterpart WSL device B may have a LAN subnet for VPN 192.168.2.1/30.

WSL device A connects via WAN technology to two ISPs 208, denoted as provider #1 and provider #2 for convenient identification (not for relative size or relative priority or relative cost, etc.). Although two ISPs are shown, the innovations described herein may also be used to convey traffic over only one WAN, or to convey traffic over three or more WANs, and these WANs may be arranged in parallel, in serial, or otherwise, subject only to having connectivity when appropriate protocols are used with the traffic they carry.

Another WSL device B 206 connects via WAN technology to the two ISPs 208, and via LAN technology to another switch 204, labeled as switch B. Switch B connects in turn via LAN technology to another user device 202, labeled as user device B 202. In a particular example, the user device B may have an IP address IP address in a LAN 192.168.30.200/24.

Within the LAN containing switch B, LAN networking protocols known as TRILL, 801.1aq, or SPB may be utilized, for example. The same or different LAN networking protocols may be used within the LAN containing switch A, on the other side of the ISP WAN clouds 208.

The WSL technology involves communication between paired WSL devices 206, such as the pair labeled in the example as WSL device A at site A and WSL device B at site B. Although a single pairing is shown, between WSL device A and WSL device B, in other embodiments device A could be additionally paired with a WSL device C, for example, and likewise WSL device B could be additionally paired with a WSL device D, for example. One-to-many, many-toone, and many-to-many arrangements of WSL devices can be operable under the packet and frame processing technologies taught herein.

In a particular example, an instance of the networking configuration shown in FIG. 2 operates as follows.

In native mode, an Avaya switch 204 of the type 4850GTS exchanges raw SPB or 802.11q frames. This is not an IPv4/IPv6 frame and therefore a router or a layer2/layer3 switch will not be able to process it. The WSL device A 206, being an edge device is also a layer2/layer3 device, but it will be able to handle these frames in the following manner.

The 802.1aq frame is received as a raw frame by a packet handler which in this particular example is called spb_handler( ). This handler can be added to a kernel to run at the start of traffic processing right after a NIC driver receives the frames and allocates a struct sk_buff structure. At a first stage a frame arrives on layer1 to the NIC, and the NIC creates a structure called sk_buff to save this raw frame from the wire. Then the device calls netif_rx(skb), which is a Linux kernel function to pass the raw frame to the kernel. At this stage, innovative packet handler spb_handler( ) will be called, which will then process the 802.1aq frame.

The spb_handler( ) code will add an IPv4 header to the frame, which will have a source and destination IP address of the virtual private subnets on either end of the two sites, namely, site A and site B in this example. The spb_handler( ) code will also add a UDP header making the traffic into VXLAN traffic (port 4789). Once this is done, spb_handler( ) will reinject this packet back to the kernel using netif_rx (skb) and then this packet will appear in the layer3 part of the kernel. So far as packet optimization code is concerned, this packet could have come into the device as a layer3 packet. The packet optimization code uses familiar techniques to perform operations such as wan optimization, failover, load balancing, and the like. The packet optimization code in this particular example encrypts the packet with IPsec encryption and then performs MPSEC® processing to send the packet on either one of the WAN connections to offer the security and other benefits of MPVPN® processing (marks of FatPipe Networks). However, FatPipe-provided software is not required in every embodiment.

At the remote WSL device B, an MPSEC® packet (for example) arrives on any of the device's WAN interfaces and then is decrypted from the IPSEC encapsulation (ESP header) to its original frame. At this point, WSL device B will strip this packet from the VXLAN header to retrieve the original 802.1aq or SPB frame. Since this SPB frame is untouched and unmodified, being operationally from the LAN protocol perspective the same as it was when it was received at the remote peer WSL device A's LAN interface, WSL device B code will then forward it to the WSL device B's LAN interface and it will travel from there to the Avaya switch B, and then on to its intended destination user device B.

Some embodiments provide or utilize a network device 206 that does layer 2 into layer 3 encapsulation. In some, the functionality includes the ability to communicate point-to-multipoint or fully meshed. This goes beyond technologies which have a point-to-point limitation in layer 2.

Some embodiments of a network device 206 aggregate multiple frames into a single packet. Some do this automatically, and others do it in response to the user's choice (meaning the administrative user). Some network devices 206 can operate in both modes—sending packets out directly or combining multiple small packets in to a larger packet. Some may also compress the payload or the header or both.

Some familiar devices receive data in from a LAN interface and send the data out through a WAN interface. However configurations using network devices 206 are "bookended" solutions that support communication between a local device 206 and a remote device 206, which interprets the incoming packets and retrieves the original frame payload. This involves operation at both layer 2 (the data link layer) and layer 3 (the network layer). A device 206 may receive Ethernet packets or IP packets. It encapsulates a layer 2 packet into a layer 3 header to send the wrapped payload over the Internet WAN link. It can potentially provide point-to-multipoint connectivity or fully meshed connectivity. By contrast, layer 2 networks tend to be point-to-point.

Code Examples

Figure 3:
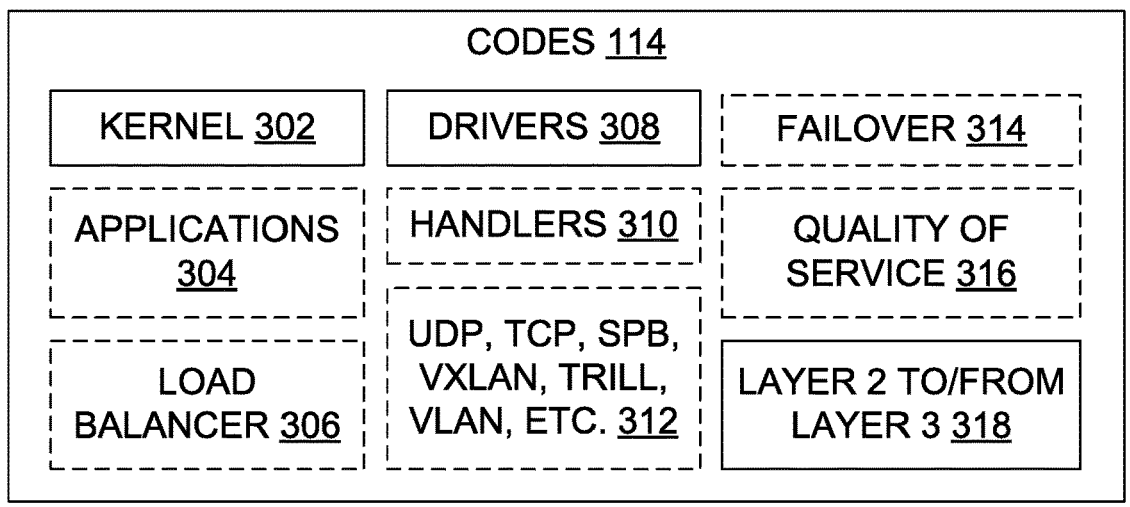
FIG. 3 is a block diagram illustrating software which may be present in some WSL devices.

FIG. 3 illustrates some of the codes 114 that are present in various embodiments. These include a kernel 302, such as a Linux kernel or other kernel, drivers 308 for network interfaces and peripherals, and handlers 310 such as the spb_handler( ), for example. Because FIG. 3 pertains to systems 102 generally, which may be end user devices 202, switches 204, WSL devices 206, or other devices or systems of devices, not every code 114 would be present in every system 102. User applications 304 may be present on user devices, for example, but not on switches 204. Load balancer code 306, failover code 314, and quality of service code 316 will often be part of a WSL device 206, but are not expected to be present on user laptops or tablets, for instance. Protocol codes 312, such as UDP, TCP, SPB, VXLAN, TRILL, VLAN, and other protocol implementations, may be present on various devices in familiar configurations. Code 318 for encapsulating layer 2 frames into layer 3 packets as described herein, and for decapsulating the layer 3 packets to retrieve the layer 2 frames, will be found on WSL devices 206, but not on switches 204 or user devices 202, for example.

Frame and Packet Formats

Figure 4:
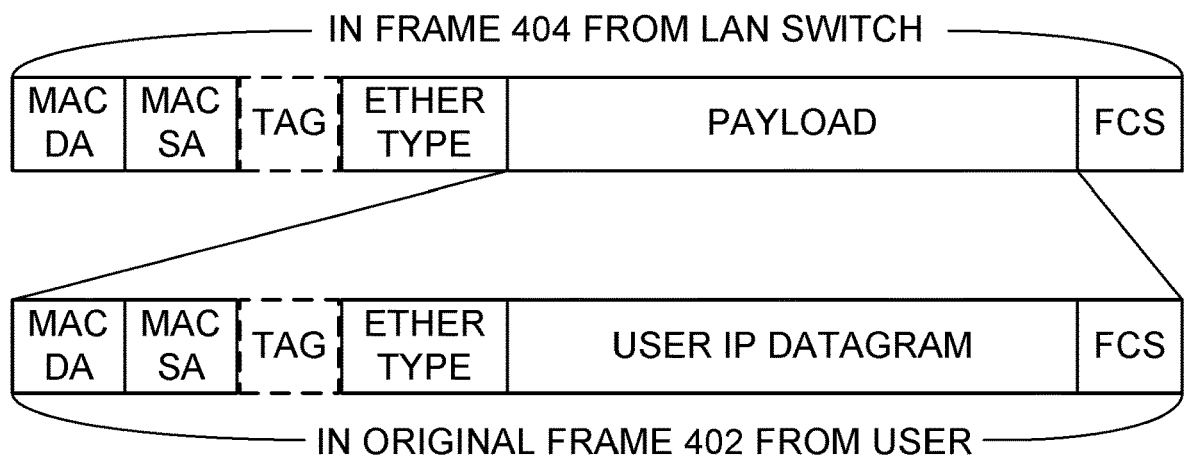
FIG. 4 is a format diagram illustrating a local area network frame sent from a user device.
Figure 5:
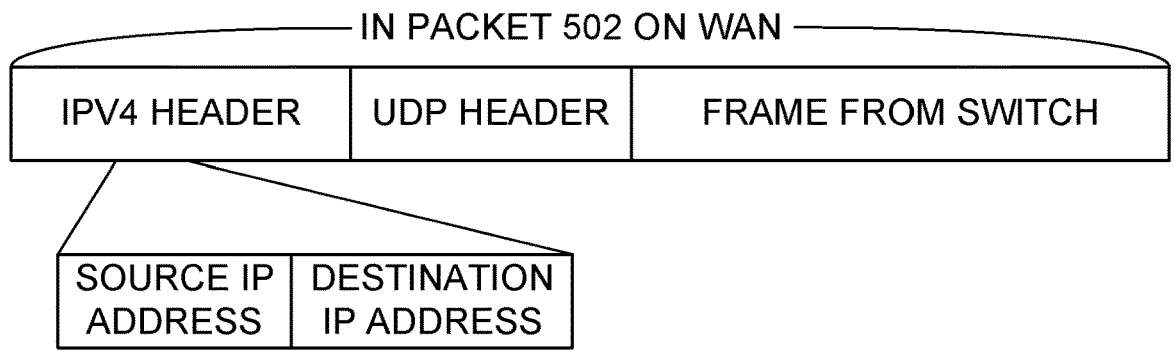
FIG. 5 is a format diagram illustrating the FIG. 4 frame encapsulated in an IP packet by addition of an IP header.

FIG. 4 illustrates an original frame 402 sent from an end user device 202 using LAN technology, within an Ethernet frame 404 sent from a switch 204. FIG. 5 shows the frame 404 from the switch ("FRAME FROM SWITCH"), within a packet 502 sent from a WSL device 206 onto a WAN 208.

Encapsulation-Decapsulation Example

Figure 6:
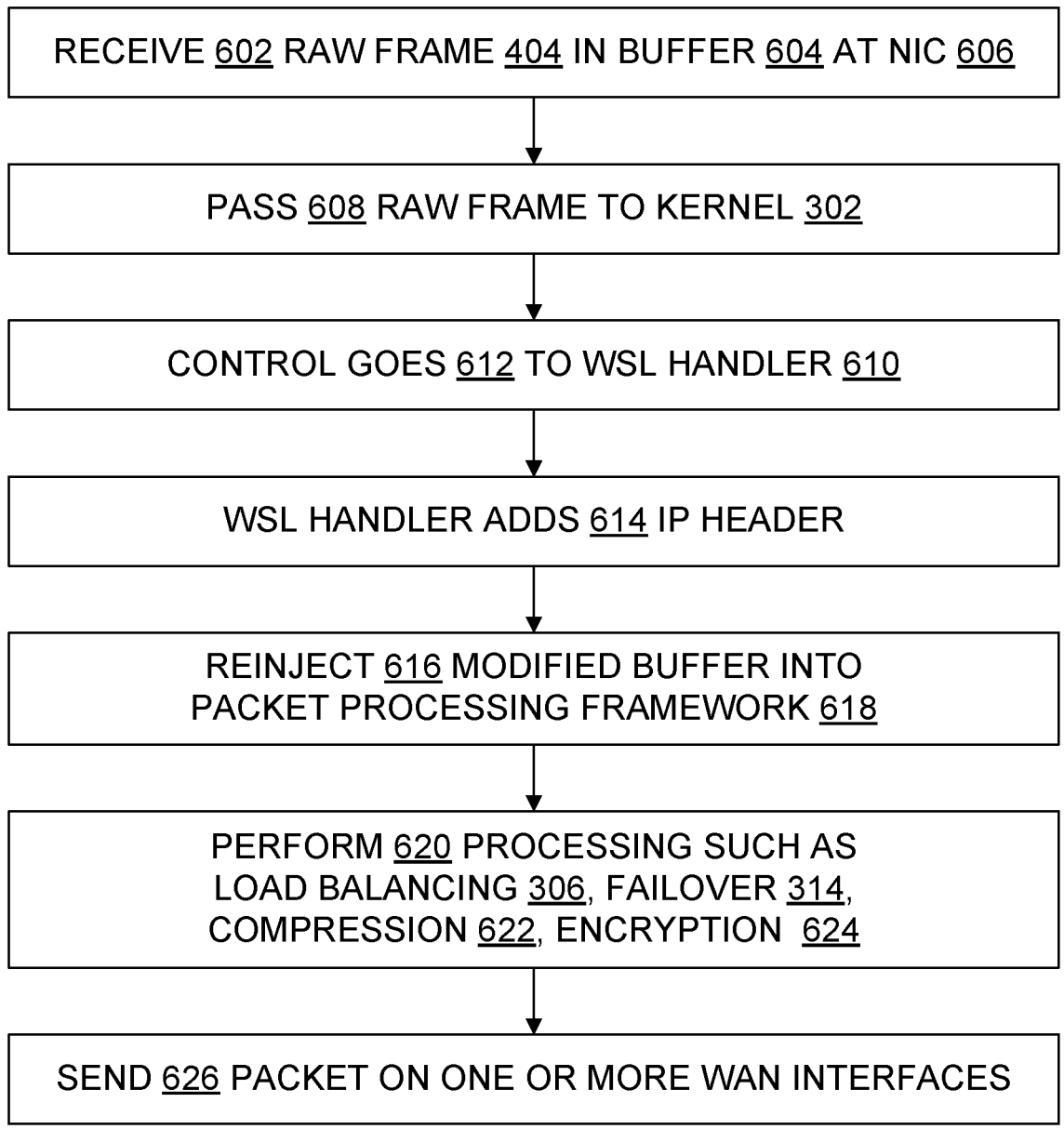
FIG. 6 is a flowchart illustrating encapsulation of a local area network frame for transmission over a wide area network.
Figure 7:
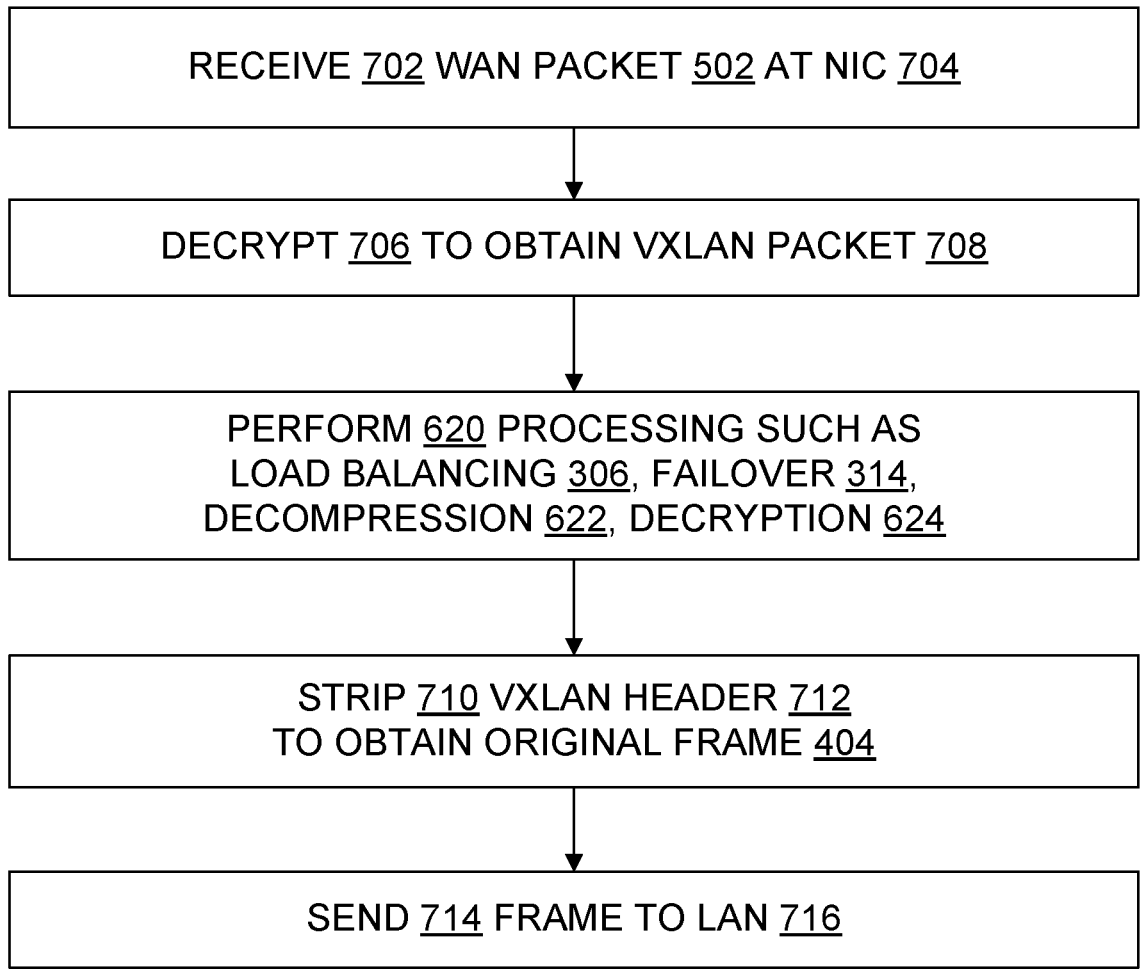
FIG. 7 is a flowchart illustrating decapsulation of the local area network frame after it has been transmitted over the wide area network.

FIG. 6 illustrates a process which encapsulates a LAN frame for transmittal over a WAN, and FIG. 7 illustrates a corresponding process which decapsulates the LAN frame to retrieve it. Together, these encapsulation and decapsulation processes and the WSL devices 206 which implement them allow LAN switches 204 to transfer frames to one another as if the switches were on the same LAN even when the switches are actually separated by one or more WANs, such as in the example FIG. 2 networking configuration.

A WSL device 206 receives 602 a raw frame 404 from a switch 204; to the switch 204, the WSL device 206 looks like another switch 204. The frame 404 from the switch 204 includes the original frame 402 sent from the user device 202. The frame 404 from the switch 204 comes into the WSL device 206 at a NIC 606, which is a LAN interface 118, and is placed in a buffer 604, e.g. an sk_buff, in memory 112 in the WSL device 206. NIC driver code then passes 608 the buffer to the kernel for processing. However, a handler 610, 310 such as spb_handler( ) intervenes to take control 612 of processing. This handler 610 adds 614 an IP header. This encapsulates the layer 2 frame 404 into a layer 3 packet. Then the handler 610 reinjects 616 the frame 404 from the switch 204, now encapsulated, into the packet processing framework 618. The term "reinject" indicates that the packet processing framework 618 may include one or more familiar optimization codes such as load balancing code 306, failover code 314, or quality of service code 316, which operates as if the packet it is given to process arrived at the device 206 as a layer 3 packet and was then injected, instead of arriving as a layer 2 frame and then being encapsulated into layer 3. The packet processing framework 618 performs 620 processing such as one or more of load balancing 306, failover 314, compression 622, or encryption 624. Then the packet processing framework 618 sends 626 the processed packet 502 onto the WAN, addressed to a counterpart WSL device 206.

FIG. 7 illustrates corresponding decapsulation at the counterpart WSL device 206. In the particular example of FIG. 6, the encapsulation included adding 614 an IP header with UDP for transmission across the WAN using a VXLAN protocol. In a particular example, the IP header may specify travel from 192.168.1.1 to 192.168.2.1, using protocol UDP and port 4789 with VXLAN. In place of VXLAN, some embodiments use GRE, and some use IP in IP.

WSL device B receives 702 the encapsulated WAN packet 502 from the WAN at a NIC 704, which is a WAN interface 118. Since encryption was used in this particular example, the code 114 in WSL device B decrypts 706 the received packet to obtain a VXLAN packet 708. Then the receiving WSL device B performs counterpart operations to those performed at the sending WSL device A, such as decompression. The receiving WSL device B strips 710 off the VXLAN header 712 to obtain the original frame 404 sent by switch A. Then the WSL device B sends 714 the frame 404 to the local LAN 716, which is LAN B, by sending the frame 404 to switch B. Switch B will then forward the original frame 402 to user device B.

ADDITIONAL EXAMPLES

Some embodiments provide or use IP addresses in IP headers encapsulated inside MAC packets. When a packet is received at an SD-WAN controller device (which may be an example of a WSL device), a MAC header of the packet is parsed by the controller, an encapsulated IP header is located, and the IP address(es) in the IP header are used in multiplexing WAN or LAN connections, in load balancing between such connections, in failing over from one or more such connections to one or more other such connections, or a combination of these operations. One or more IP addresses are modified accordingly. Then the modified addresses are reencapsulated within the MAC header and forwarded.

An operating environment for an embodiment, and an embodiment itself, may include one or more computer systems. A computer system includes at least one processor. The computer system also includes one or more computer-readable storage media, e.g., volatile memory, non-volatile memory, fixed in place media, removable media, magnetic media, optical media, solid-state media, CD, DVD, memory stick, RAM, ROM, hard disks. For compliance with current United States patent requirements, neither a computer-readable medium nor a computer-readable storage medium nor a computer-readable memory is a signal per se.

Some embodiments load balance and optimize encapsulated unencrypted network sessions. In some networks, there are multiple encapsulated protocols, such as MPLS, GRE, VXLAN. With those kinds of packets, a normal proxy mechanism will not work since it will not able to construct the proper connection oriented protocol (such as TCP) or connectionless protocol (such as UDP, ICMP, etc.). Those sessions could be load balanced, failed over, and optimized through a deduplication mechanism such as compression (stream based or non-stream based), chunk level caching, or both. Some optimizations also involve dynamically choosing an appropriate congestion algorithm based on path traffic conditions. In the meantime, some approaches maintain an original encapsulated protocol header such as MPLS, GRE, VXLAN. Some will only begin to de-duplicate encapsulated unencrypted network sessions when the peer device is detected, which can be used to recover the original packets after decompression or chunk rewrite based on the chunk hash, or both.

Some embodiments operate in a configuration that combines data center Software Defined Networking (SDN) and Software Defined WAN (SD-WAN) into a single integrated solution for networking and unified communications transporting LAN frames across one or more WANs (WSL technology). Some integrate SD-WAN hybrid networking products with a fabric-based architecture. This can support data centers and branch offices. Combined SD-WAN and fabric technology can help drive simplicity and agility across an entire network to help ensure high-quality, real-time unified communications, providing a single source for a converged solution. Such combinations may be utilized with a hybrid cloud deployment model. Some enable a fabric-enabled SD-WAN solution, which may be an example of WSL technology. Some automatically detect and re-route a degrading WAN connection, which can provide seamless failover of VoIP, video and data sessions, helping ensure reliable quality communications. Some operate in enterprise data centers with Ethernet fabric architectures. In some, an integrated network fabric not only delivers network services across physical and virtual networking, but also provides a unified management platform. In some, SD-WAN is implemented as part of a comprehensive WAN architecture, which may include WSL technology. Some embodiments utilize IP VPN technology. Some utilize router clustering technology. Some perform WAN link load balancing, WAN path control, or both. In some, features transcend WAN failures to maintain business continuity, including one or more of: zero-touch branch deployment, hybrid WAN connectivity, tuned application performance, easy integration, granular WAN visibility, multi-path security, secure full mesh VPN connectivity and flexible centralized policy deployments.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 6 and 7 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A networking process, the process performed in an environment which includes IP (internet protocol) items, a WAN (wide area network), and SD-WAN (software-defined wide area network) or WSL (WAN-spanning LAN) devices, the process comprising:
   receiving a layer 2 frame from a first switch in a kernel at a first networking device which includes an SD-WAN device or a WSL device or both;
   obtaining within the first networking device an IP address of a second networking device which includes an SD-WAN device or a WSL device or both, the second networking device separated from the first networking device by a WAN;
   adding an IP header to the layer 2 frame within the first networking device, thereby creating within the first networking device a layer 3 packet which contains the layer 2 frame;
   reinjecting the layer 2 frame into the kernel within the layer 3 packet, for processing as part of the layer 3 packet; and
   transmitting the layer 3 packet toward the WAN through a WAN interface of the first networking device.

2. The networking process of claim 1, further comprising:
   receiving the layer 3 packet at the second networking device;
   stripping off the IP header, thereby retrieving the layer 2 frame; and
   sending the layer 2 frame from the second networking device toward a second switch.

3. The networking process of claim 1, wherein obtaining the IP address of the second networking device comprises performing at least one of the following: load balancing, failing over, or implementing a quality of service criterion.

4. The networking process of claim 1, wherein the layer 2 frame is characterized in at least one of the following ways:
   the layer 2 frame is an Ethernet frame;
   the layer 2 frame is a data link layer frame;
   the layer 2 frame includes a VLAN (virtual local area network) tag;
   the layer 2 frame is a TRILL (transparent interconnection of lots of links) frame;
   the layer 2 frame is an IS-IS (intermediate system to intermediate system) frame;
   the layer 2 frame is an SPB (shortest path bridging) frame.

5. The networking process of claim 1, wherein the layer 3 packet is a virtual extensible local area network packet.

6. The networking process of claim 1, wherein the process further comprises establishing a virtual private network tunnel between the first networking device and the second networking device, and wherein transmitting comprises transmitting the layer 3 packet through the WAN interface into the virtual private network tunnel.

7. The networking process of claim 1, wherein receiving the layer 2 frame comprises receiving the layer 2 frame in a memory buffer, and wherein adding the IP header to the layer 2 frame within the first networking device comprises modifying the memory buffer to contain the layer 3 packet and then submitting the layer 3 packet for processing by a kernel packet processing framework.

8. The networking process of claim 1, wherein the process comprises adding a UDP (user datagram protocol) header which creates the layer 3 packet as a VXLAN (virtual extensible local area network) packet.

9. The networking process of claim 1, wherein the process further comprises aggregating data from multiple layer 2 frames into the layer 3 packet.

10. A computer-readable storage medium configured with software which upon execution by a first networking device having at least one processor performs a networking process, the networking process comprising:
   receiving a layer 2 frame in a kernel at the first networking device, the layer 2 frame having a payload which includes a user frame;
   obtaining within the first networking device an IP address of a second networking device which is physically separated from the first networking device by at least one mile;
   adding an IP header to the layer 2 frame within the first networking device, thereby creating within the first networking device a layer 3 packet which contains the layer 2 frame;
   reinjecting the layer 2 frame into the kernel within the layer 3 packet, for processing as part of the layer 3 packet; and
   transmitting the layer 3 packet toward the second networking device through a wide area network interface of the first networking device.

11. The computer-readable storage medium of claim 10, wherein the networking process further comprises:
   receiving the layer 3 packet at the second networking device;
   stripping off the IP header, thereby retrieving the layer 2 frame; and
   sending the layer 2 frame from the second networking device toward a switch.

12. The computer-readable storage medium of claim 10, wherein the layer 2 frame is characterized in at least two of the following ways:
   the layer 2 frame is an Ethernet frame;
   the layer 2 frame is a data link layer frame;
   the layer 2 frame includes a VLAN (virtual local area network) tag;
   the layer 2 frame is a TRILL (transparent interconnection of lots of links) frame;
   the layer 2 frame is an IS-IS (intermediate system to intermediate system) frame;
   the layer 2 frame is an SPB (shortest path bridging) frame.

13. The computer-readable storage medium of claim 10, wherein the networking process further comprises establishing a virtual private network tunnel between the first networking device and the second networking device, and wherein transmitting comprises transmitting the layer 3 packet through the wide area network interface into the virtual private network tunnel.

14. The computer-readable storage medium of claim 10, wherein the networking process comprises adding a UDP (user datagram protocol) header which creates the layer 3 packet as a VXLAN (virtual extensible local area network) packet.

15. A first networking device which operates as a network extension device, the first networking device comprising:
   at least one processor;
   a memory in operable communication with the processor; and
   a WSL module comprising WSL hardware operating with WSL software to perform WSL operations which extend LAN communication across a WAN, "LAN" denoting "local area network", "WAN" denoting "wide area network", "WSL" denoting "WAN-spanning LAN", the WSL module comprising a network interface card and a portion of the memory which is configured by the WSL software, the WSL operations comprising operations which (a) add an IP header to a LAN frame received in a kernel of the first networking device, the LAN frame being a layer 2 frame, (b) create a layer 3 packet containing the IP header and the LAN frame, (c) reinject the LAN frame in the kernel within the layer 3 packet, for processing as part of the layer 3 packet, and (d) transmit the layer 3 packet toward a second networking device through a wide area network interface of the first networking device.

16. The first networking device of claim 15, in combination with the second networking device.

17. The first networking device of claim 15, wherein as part of the WSL operations the WSL module frame adds the IP header and transmits a LAN frame which is a broadcast frame or a multicast frame or both.

18. The first networking device of claim 15, further comprising a packet processing framework which is configured to perform one or more of load balancing, failover, compression, or encryption.

19. The first networking device of claim 15, wherein the first networking device comprises at least two wide area network interfaces and a local area network interface.

20. The first networking device of claim 15, wherein as part of the WSL operations the WSL module discards a LAN frame which has a source address and a destination address on the same LAN segment as one another.

* * * * *